(12) United States Patent
Kim et al.

(10) Patent No.: US 11,772,169 B2
(45) Date of Patent: Oct. 3, 2023

(54) CUTTING INSERT AND CUTTING TOOL EQUIPPED WITH THE SAME

(71) Applicant: KORLOY INC., Seoul (KR)

(72) Inventors: Sung Hun Kim, Cheongju-si (KR); Young Heum Kim, Cheongju-si (KR); Byung Hoon Min, Cheongju-si (KR); Hyo San Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 0 days.

(21) Appl. No.: 17/772,712

(22) PCT Filed: Aug. 26, 2020

(86) PCT No.: PCT/KR2020/011378
§ 371 (c)(1),
(2) Date: Apr. 28, 2022

(87) PCT Pub. No.: WO2021/132837
PCT Pub. Date: Jul. 1, 2021

(65) Prior Publication Data
US 2023/0191499 A1    Jun. 22, 2023

(30) Foreign Application Priority Data
Dec. 27, 2019 (KR) .................... 10-2019-0176363

(51) Int. Cl.
*B23B 27/16* (2006.01)

(52) U.S. Cl.
CPC ...... *B23B 27/1618* (2013.01); *B23B 27/1622* (2013.01); *B23B 2200/0447* (2013.01); *B23B 2200/321* (2013.01)

(58) Field of Classification Search
CPC .......... B23B 2200/321; B23B 2200/32; B23B 2200/201; B23B 2200/081; B23B 27/143;
(Continued)

(56) References Cited

U.S. PATENT DOCUMENTS

| 4,359,300 | A | * | 11/1982 | Hazra | ................... | B23B 27/143 |
| | | | | | | 407/114 |
| 5,449,255 | A | * | 9/1995 | Katbi | .................... | B23B 27/143 |
| | | | | | | 407/115 |

(Continued)

FOREIGN PATENT DOCUMENTS

| JP | H06-55312 A | 3/1994 |
| KR | 10-0661527 B1 | 12/2006 |

(Continued)

OTHER PUBLICATIONS

English translation of KR 100661527 (Year: 2006).*
English translation of KR 101039888 (Year: 2011).*

*Primary Examiner* — Alan Snyder
(74) *Attorney, Agent, or Firm* — Rabin & Berdo, P.C.

(57) ABSTRACT

A cutting insert according to the present disclosure includes a first raised portion and a second raised portion stepped from the first raised portion, which are formed on a top surface and along a center line connecting the center of the corner portion and the center of the top surface. The first raised portion is located closer to the corner portion than the second raised portion is, and the first raised portion is inclined downwardly from the second raised portion toward the corner portion. The second raised portion is formed at a higher position from the bottom surface than the first raised portion, and a side portion connected to the first raised portion is inclined downwardly from the second raised portion toward the first and second cutting edges.

12 Claims, 9 Drawing Sheets

(58) Field of Classification Search
CPC ............ B23B 27/1607; B23B 27/1618; B23B 27/1637; B23B 27/1648; B23C 2200/323; B23C 2200/32; B23C 2200/201; B23C 2200/081; B23C 5/205
See application file for complete search history.

(56) References Cited

U.S. PATENT DOCUMENTS

| | | | |
|---|---|---|---|
| 2004/0037659 A1* | 2/2004 | Sung | B23C 5/202 407/116 |
| 2011/0229279 A1* | 9/2011 | Kobayashi | B23B 27/143 407/115 |
| 2013/0272808 A1* | 10/2013 | Cohen | B23B 27/143 407/115 |
| 2014/0286717 A1* | 9/2014 | Lof | B23B 27/143 407/115 |
| 2016/0082518 A1* | 3/2016 | Sakai | B23B 27/143 407/115 |
| 2019/0039152 A1* | 2/2019 | Ikeda | B23B 27/143 |

FOREIGN PATENT DOCUMENTS

| | | |
|---|---|---|
| KR | 10-1039888 B1 | 6/2011 |
| KR | 10-2012-0003248 A | 1/2012 |
| KR | 10-2016-0041357 A | 4/2016 |

* cited by examiner

PRIOR ART

FIG. 11

PRIOR ART

CUTTING INSERT AND CUTTING TOOL EQUIPPED WITH THE SAME

TECHNICAL FIELD

The present disclosure relates to a cutting insert and a cutting tool equipped with the same.

BACKGROUND ART

Generally, a cutting insert is fastened to a cutting tool mounted on a machine tool and is used for cutting a workpiece such as a machine part and so on that is made of iron, non-ferrous metal, non-metal material, and so on.

Such a cutting insert includes a top surface, a bottom surface oriented in the opposite direction, a lateral surface connecting the top surface and the bottom surface to each other, and a cutting edge (a cutting blade) for cutting the workpiece.

Figure 10:
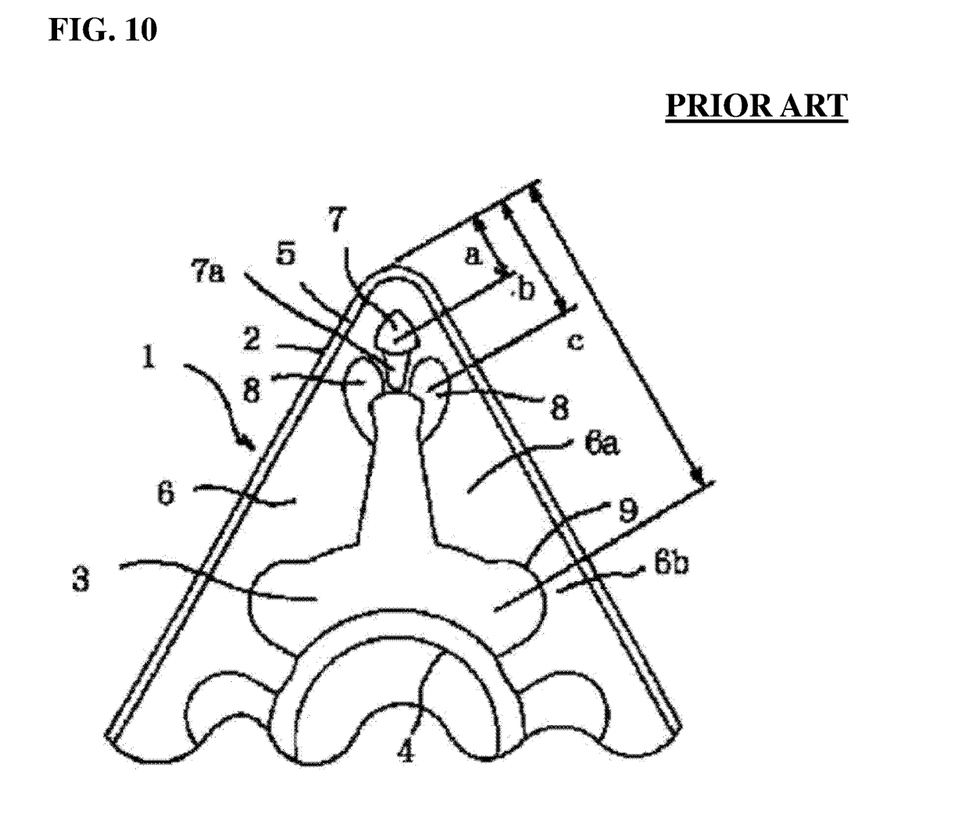
FIGS. 10 and 11 illustrate a related cutting insert.
Figure 11:
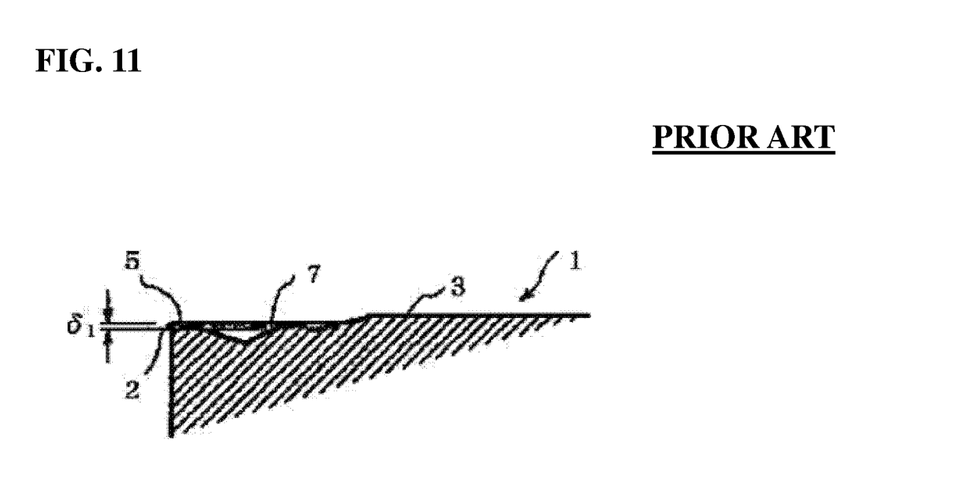

FIGS. 10 and 11 illustrate a cutting insert disclosed in Japanese Patent Laid-Open No. 6-55312 as an example of a related cutting insert. For reference, FIGS. 10 and 11 correspond to FIGS. 3 and 2(a) of Japanese Patent Laid-Open No. 6-55312 mentioned above, respectively, and for convenience of explanation, reference numerals and the like are indicated as they are without modification. In addition, it is to be noted that if the reference numerals are the same as those in the description of the present disclosure to be described below, they do not necessarily refer to the same components.

In this related cutting insert, a chip breaker groove 6 is provided with a first breaker protrusion 7 and a second breaker protrusion 8 close to each other at a corner portion, based on the cutting direction of the cutting edge 2. In addition, continuing from the second breaker protrusion 8, there are formed chip breaker groove portions 6a and 6b with wide and narrow widths with respect to the central boss surface 3, respectively. In addition, the narrow-width chip breaker groove portion 6b has a third breaker protrusion 9 formed therein.

However, such a related cutting insert has a problem that the first breaker protrusion is simply formed in a convex shape such that the first breaker protrusion is located close to the cutting edge, and during low-speed feeding, chips are not properly curled and there are chips bouncing, resulting in inconstant radius of the curled chip and generation of tangled chips.

DETAILED DESCRIPTION OF INVENTION

Technical Problem

The present disclosure is to solve the problems of the related art as described above, and an object of the present disclosure is to provide a cutting insert capable of effectively curling and discharging thin chips in a low feed area, and generating stable chip curling without overloading even at a high feed rate.

Technical Solution

In order to achieve the objects described above, a cutting insert according to an embodiment of the present disclosure is provided, which is a polygonal cutting insert including a top surface, a bottom surface, a lateral surface connecting the top surface and the bottom surface, in which: the top surface includes a corner portion, and a first edge portion and a second edge portion respectively extending from the corner portion; the corner portion includes a corner cutting edge, the first edge portion includes a first cutting edge, and the second edge portion includes a second cutting edge, respectively; a first raised portion and a second raised portion stepped from the first raised portion are formed on the top surface and along a center line connecting a center of the corner portion and a center of the top surface; the first raised portion is located closer to the corner portion than the second raised portion is, and the first raised portion is inclined downwardly from the second raised portion toward the corner portion; the second raised portion is formed at a higher position from the bottom surface than the first raised portion; and a side portion connected to the first raised portion is inclined downwardly from the second raised portion toward the first and second cutting edges.

In addition, a main breaker is provided in front of the first raised portion, and the main breaker protrudes from a corner cutting edge cutting surface of the corner cutting edge, a first cutting edge cutting surface of the first cutting edge, and a second cutting edge cutting surface of the second cutting edge, and includes a lower inclined surface connected to the corner cutting edge cutting surface, the first cutting edge cutting surface, the second cutting edge cutting surface, and an upper inclined surface connected to the lower inclined surface.

In addition, the lower inclined surface is formed in a concave shape.

In addition, a boundary line between the upper inclined surface and the lower inclined surface is formed at a position higher than the corner cutting edge, the first cutting edge, and the second cutting edge.

In addition, a radius of curvature of the lower inclined surface increases as it approaches a center of the corner portion.

In addition, auxiliary blade protrusions extending to both sides of the main breaker are provided, in which the auxiliary blade protrusions are distanced away from the first cutting edge and the second cutting edge with their height also decreasing, as they are farther away from a center of the corner portion, and when viewed toward the lateral surface, have a lower height than the first cutting edge, the second cutting edge, and the corner cutting edge.

In addition, widths of the auxiliary blade protrusions decrease as they are farther away from the center of the corner portion.

In addition, the corner cutting edge is located at a higher position than the first cutting edge and the second cutting edge.

In addition, a plurality of two-stage auxiliary protrusions are formed along the first edge portion and the second edge portion.

In addition, the two-stage auxiliary protrusions have a triangular shape when viewed into the top surface.

Advantageous Effects

The cutting insert having the configuration described above according to an embodiment of the present disclosure has the following effects.

Since the first raised portion has a structure of rising from the main breaker to the second raised portion, when machining a workpiece, the chip does not stay on the top surface but rides on the first raised portion and collides with the second raised portion such that the chip can be effectively curled or sheared.

In addition, since the lower inclined surface of the main breaker is formed in the concave shape, there is generated more clearance space from the cutting edge to the main breaker, so that the chip overload that may occur at a high feed rate can be effectively discharged, which can greatly increase the life of the cutting insert.

In addition, by arranging the auxiliary blade protrusions, it is possible to effectively curl thin and wide chips that occur during cutting process with a large cutting depth of cut and a small feed rate.

In addition, by configuring a R type corner cutting edge, it is possible to minimize the contact area with the workpiece, thereby reducing cutting resistance and forming excellent surface roughness on the workpiece.

In addition, by arranging the two-stage auxiliary protrusions, the direction of long chips that may occur during the cutting process can be changed, or generation of long chips can be reduced by the breaking at the corner portion.

In addition, since a machined surface with excellent chip handling and chip evacuation can be obtained without chip clogging during inner diameter machining, the embodiment can be used stably even in automated machining.

Meanwhile, it goes without saying that the present disclosure includes other effects, although not explicitly stated, that can be expected from the configuration described above.

BRIEF DESCRIPTION OF THE DRAWINGS

FIGS. 2A and 2B show partially enlarged views of an encircled part P of FIG. 1A, in which

BEST MODE FOR IMPLEMENTING THE INVENTION

Hereinafter, preferred embodiments of the present disclosure will be described in detail with reference to the accompanying drawings, which will be readily apparent to those skilled in the art to which the present disclosure pertains. However, the description proposed herein is just a preferable example for the purpose of illustrations only, not intended to limit the scope of the disclosure, so it should be understood that other equivalents and modifications could be made thereto without departing from the scope of the disclosure.

Figure 1A:
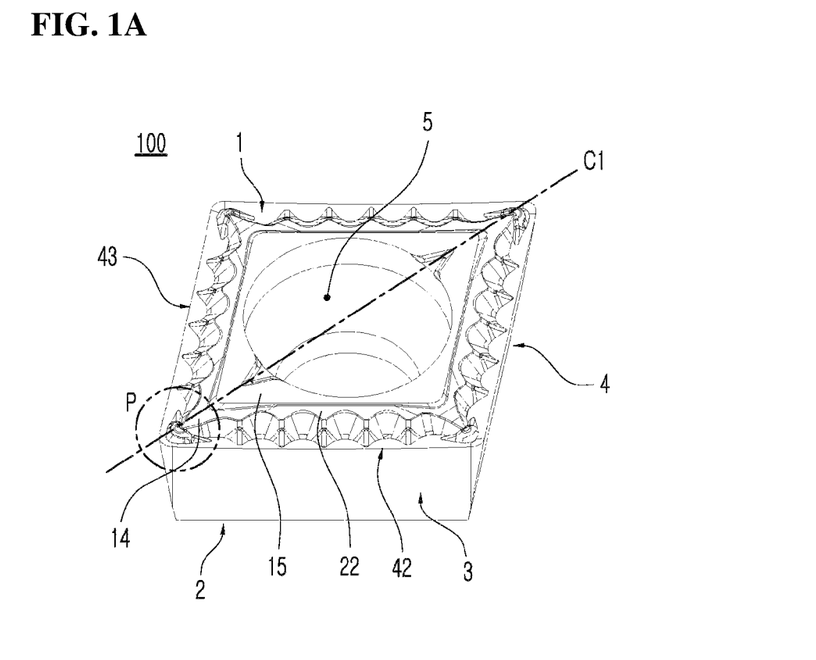
FIG. 1A is a perspective view of a cutting insert according to an embodiment of the present disclosure.
Figure 1B:
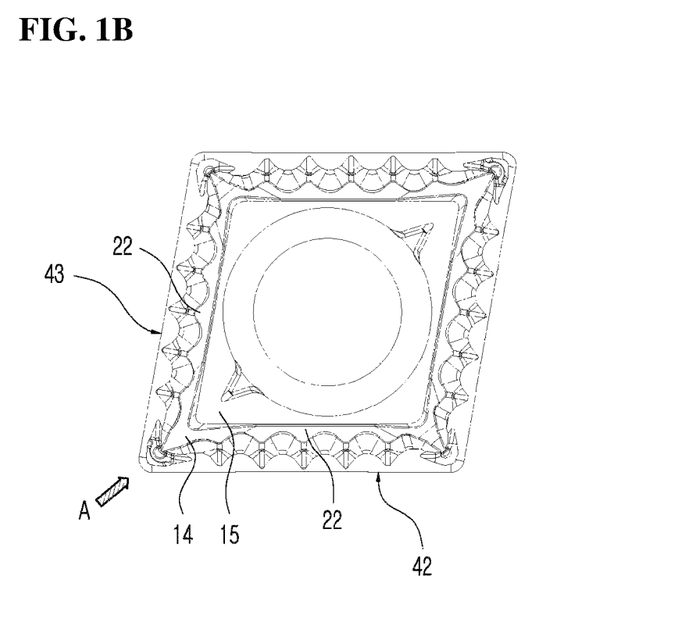
FIG. 1B is a plan view.

As illustrated in FIGS. 1A and 1B, a cutting insert according to an embodiment of the present disclosure is a polygonal cutting insert that includes a top surface 1, a bottom surface 2, and a lateral surface 3 connecting the top surface 1 and the bottom surface 2. In the present embodiment, a cutting insert having an approximately rhombic shape when viewed toward the top surface is exemplified. In addition, a mounting hole 5 penetrating from the top surface 1 to the bottom surface 2 is provided, and a cutting edge 4 is formed in a portion where the top surface 1 and the lateral surface 3 meet.

Figure 2A:
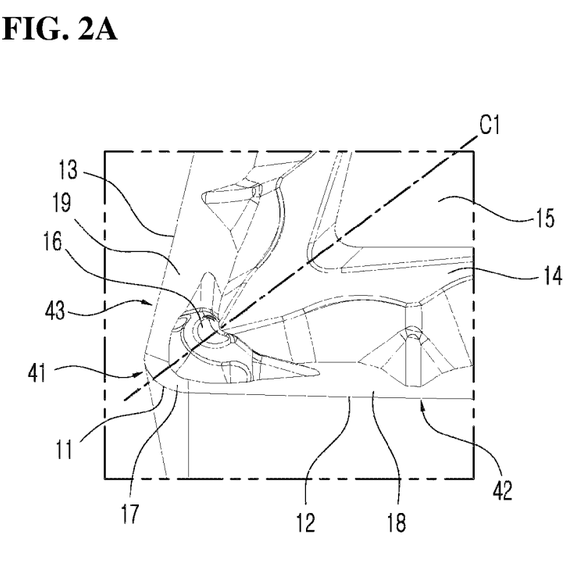
FIG. 2A is a perspective view.
Figure 2B:
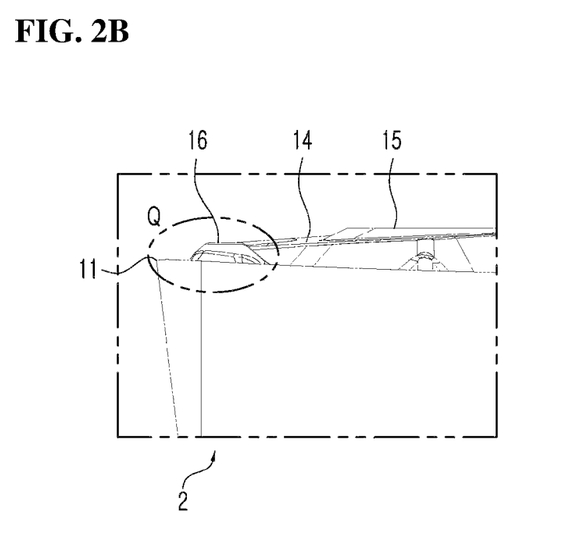
FIG. 2B is a side view.

As illustrated in FIGS. 2A and 2B, the top surface 1 includes a corner portion 11, and a first edge portion 12 and a second edge portion 13 respectively extending from the corner portion 11.

The corner portion 11 is provided with a corner cutting edge 41, the first edge portion 12 is provided with a first cutting edge 42, and the second edge portion 13 is provided with a second cutting edge 43, respectively.

A first raised portion 14, and a second raised portion 15 stepped from the first raised portion 14 are formed on the top surface 1, along a center line C1 connecting the center of the corner portion 11 and the center of the top surface 1.

The first raised portion 14 is located closer to the corner portion 11 than the second raised portion 15 and is inclined downwardly from the second raised portion 15 toward the corner portion 11. In addition, the second raised portion 15 is formed at a higher position from the bottom surface 2 than the first raised portion 14. In addition, the first raised portion 14 is connected to a main breaker 16 (a main chip breaker) which will be described below.

In this way, since the first raised portion 14 has a structure that gradually rises from the main breaker 16 to the second raised portion 15 to be described below, during machining of a workpiece, instead of staying on the top surface 1, the chips ride on the first raised portion 14 and then collide with the second raised portion 15 to be effectively curled or sheared.

In addition, as illustrated in FIGS. 1A and 1B, a side portion 22 connected to the first raised portion 14 may be formed to surround the second raised portion 15. The side portion 22 may be inclined downwardly from the second raised portion 15 toward the first cutting edge 42 and the second cutting edge 43. As a result, thin and drooping chips generated from the cutting edges 42 and 43 collide with the second raised portion 15 to be curled or sheared.

As illustrated in FIGS. 2A and 2B, the main breaker 16 is provided in front of the first raised portion 14.

The main breaker 16 protrudes from a corner cutting edge cutting surface 17 of the corner cutting edge 41, a first cutting edge cutting surface 18 of the first cutting edge 42 and a second cutting edge cutting surface 19 of the second cutting edge 43. In addition, the main breaker may be formed in a circular shape when viewed toward the top surface.

Figure 3:
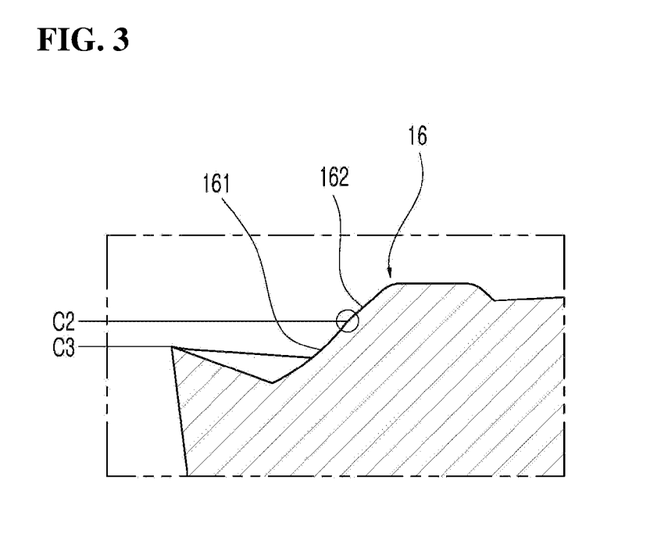
FIG. 3 is a partially enlarged view of an encircled part Q of FIG. 2B.

In addition, as illustrated in FIG. 3, the main breaker 16 includes a lower inclined surface 161 connected to the corner cutting edge cutting surface 17, the first cutting edge cutting surface 18, and the second cutting edge cutting surface 19, and an upper inclined surface 162 connected to the lower inclined surface 161. In this example, the lower inclined surface 161 may be formed in a concave shape.

In addition, a boundary line C3 between the upper inclined surface 162 and the lower inclined surface 161 is formed at a higher position than the corner cutting edge 41, the first cutting edge 42, and the second cutting edge 43.

FIG. 3 illustrates it being formed higher than a height line C3 of the corner cutting edge 41.

Figure 4A:
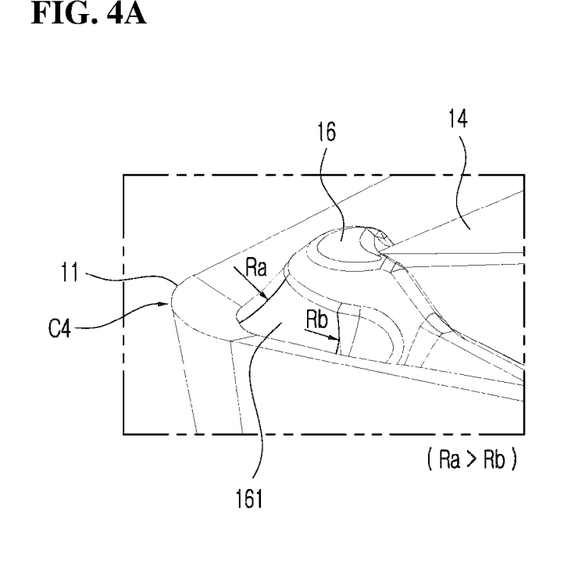
FIGS. 4A and 4B are views provided to explain a radius of curvature of a lower inclined surface of a main breaker in the cutting insert of FIGS. 1A and 1B.
Figure 4B:
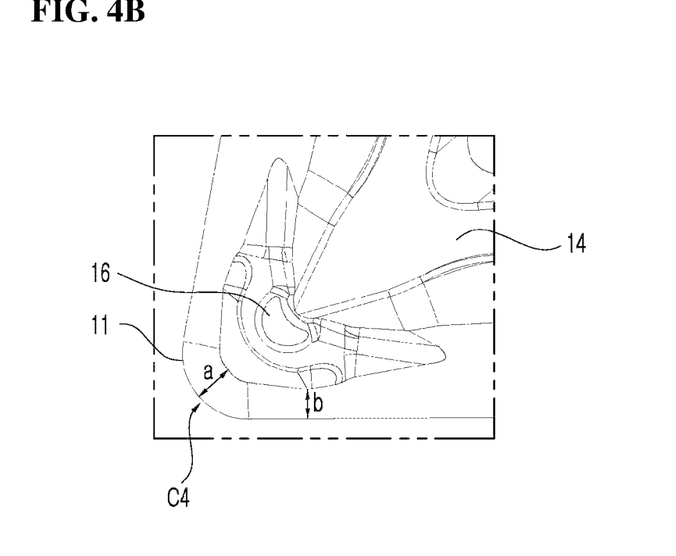

As illustrated in FIGS. 4A and 4B, the lower inclined surface 161 of the main breaker 16 has a larger radius of curvature (Ra>Rb) as it is closer to a center C4 of the corner portion 11. That is, the radius of curvature is the largest at a point (a) closest to the center C4 of the corner portion 11, and the radius of curvature is gradually decreased at a point (b) as the distance from the center C4 increases.

Through the configuration described above, the main breaker 16 can induce a constant curling of the chips generated from the cutting edges 41, 42, 43 in any direction. In addition, thanks to the concave structure of the lower inclined surface 161 of the main breaker 16, soft chips such as mild steel, low carbon steel, and the like can be driven deep into the bottom of the lower inclined surface 161, and this enables effective curling of the chips. If the cutting insert is formed with the inclined surface of the main breaker which is simply formed in convex shape, the main breaker will be located close to the cutting edge, and during a low-speed feeding, there occur some chips that are not curled properly and bounced. Therefore, the radius of the curled chips is not constant and tangled chips occur. Conversely, in the present embodiment in which the lower inclined surface is formed in the concave shape, there is generated more clearance space from the cutting edge to the main breaker, so that the chip overload that may occur at a high feed rate can be effectively discharged, which can greatly increase the life of the cutting insert.

Figure 9:
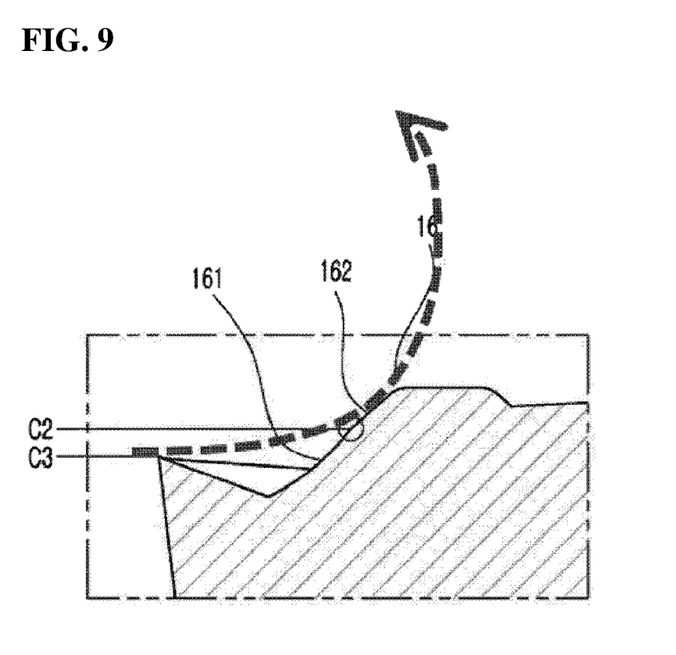
FIG. 9 illustrates a chip curled through an upper inclined surface in the cutting insert of FIGS. 1A and 1B in a high feed condition.

Meanwhile, as illustrated in FIG. 9, in high-feed (0.25 mm/rev or more) cutting conditions or for a workpiece with high hardness, chips of high hardness are curled through the upper inclined surface 162 without touching the lower inclined surface 162 which is concave. Chips generated under these conditions may increase in hardness due to high temporary hardening, which may cause strain on the cutting edge. However, in the present disclosure, it is possible to reduce the cutting load by increasing the radius of the chip curl through the structure of the upper inclined surface 162 as described above.

Figure 5A:
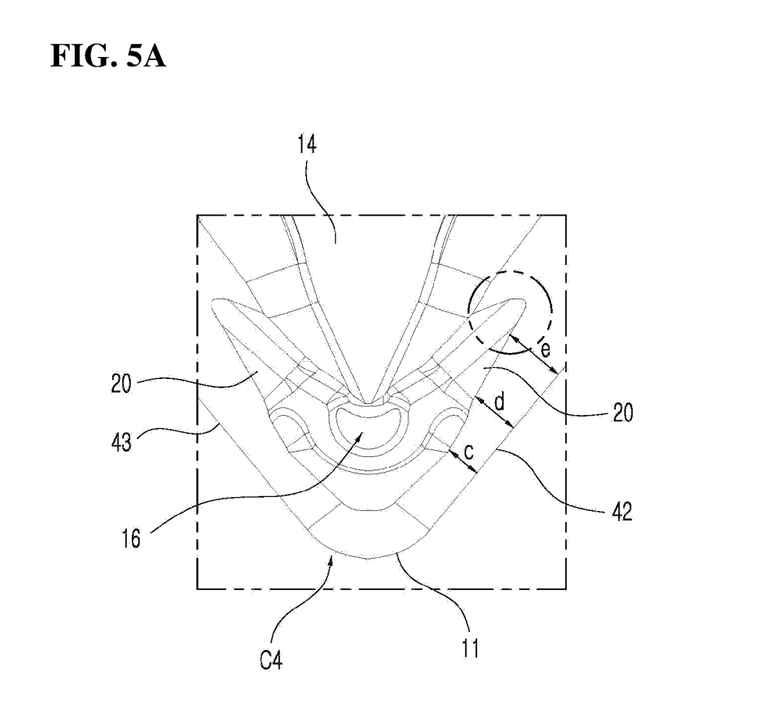
FIGS. 5A and 5B are views provided to explain a configuration of auxiliary blade protrusions in the cutting insert of FIGS. 1A and 1B.
Figure 5B:
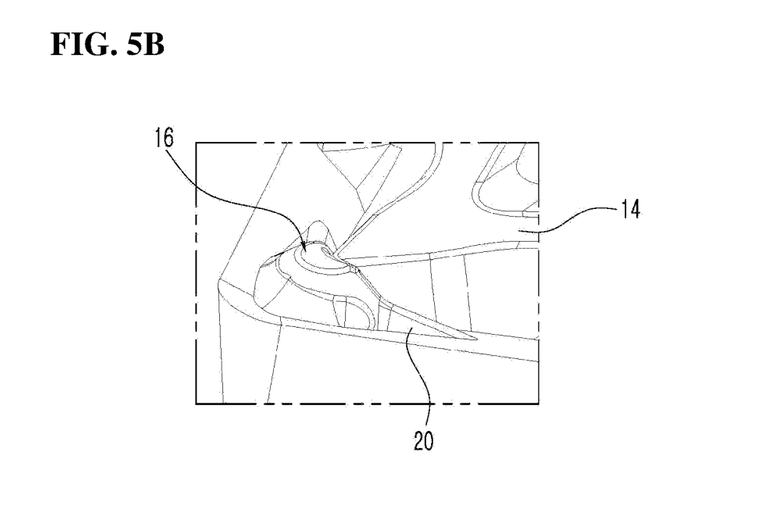

As illustrated in FIGS. 5A and 5B, auxiliary blade protrusions 20 extending from the main breaker 16 may be further provided on both sides of the main breaker 16.

Figure 6:
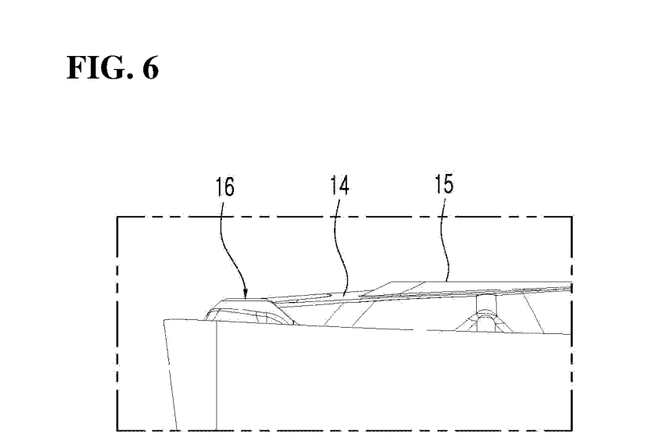
FIG. 6 is a view illustrating the interrelationship of the main breaker, a first raised portion, and a second raised portion in the cutting insert of FIGS. 1A and 1B.

In addition, the auxiliary blade protrusions 20 are gradually distanced away from the first cutting edge 42 and the second cutting edge 43 and their heights are also lower than the cutting edges 41, 42 and 43 (see FIG. 6) and the widths are decreased, as they are farther away from the center C4 of the corner portion 11. That is, they are distanced away from the cutting edges 42 and 43 with their heights and widths also being gradually decreased as they are farther away from the center of the corner portion C4, that is, at points c, d, and e.

This auxiliary blade protrusions 20 are configured to assist the main breaker 16 and configured for effective curling of thin and wide chips that occur during cutting with a large cutting depth (1.2 mm or more) and a small feed (0.1 mm/rev or less). Without the auxiliary blade protrusions 20, curling of the chips may not be constant, and rotating chips may be generated, resulting in tangled chips.

In addition, when the auxiliary blade protrusions 20 are formed to be larger in size or higher than the cutting edge, chips curled to one side can occur, and the chips can hit and damage the cutting edge or are not easily discharged. In order to prevent this, in the present embodiment, the auxiliary blade protrusions 20 are provided to ensure constant curling of the chips, in which the auxiliary blade protrusions 20 are configured such that they are progressively distanced away from the cutting edge in the direction of chip discharging, thereby improving chip handling performance.

Figure 7:
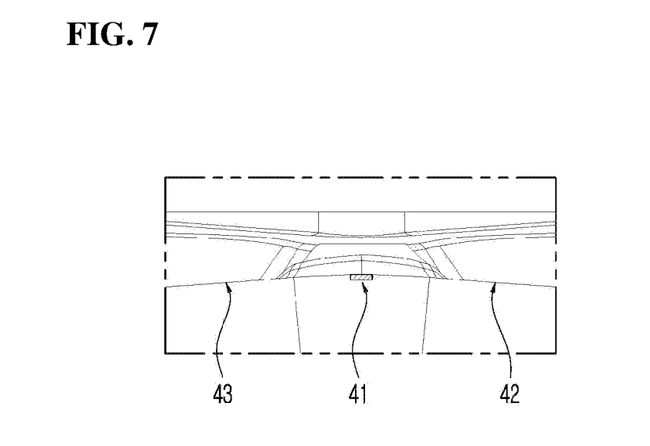
FIG. 7 is a view illustrating the interrelationship of a corner portion, a first cutting edge, and a second cutting edge in the cutting edge of FIGS. 1A and 1B.

Meanwhile, as illustrated in FIG. 7, when the cutting insert is viewed toward the side in the direction A in FIG. 1B, the corner cutting edge 41 is formed in a higher position than the first cutting edge 42 and the second cutting edge 43. In addition, the corner cutting edge 41 is formed in an R type rather than a straight line type in order to reduce the contact area of the workpiece.

With this, it is possible to minimize the contact area with the workpiece, thereby reducing cutting resistance and forming excellent surface roughness on the workpiece. In addition, as the contact area with the workpiece is reduced, vibration generated during machining is also reduced, so that the wear of the clearance surface (lateral surface in the present embodiment) generated by contact with the workpiece and vibration is reduced, thereby improving the lifespan of the cutting insert.

Figure 8A:
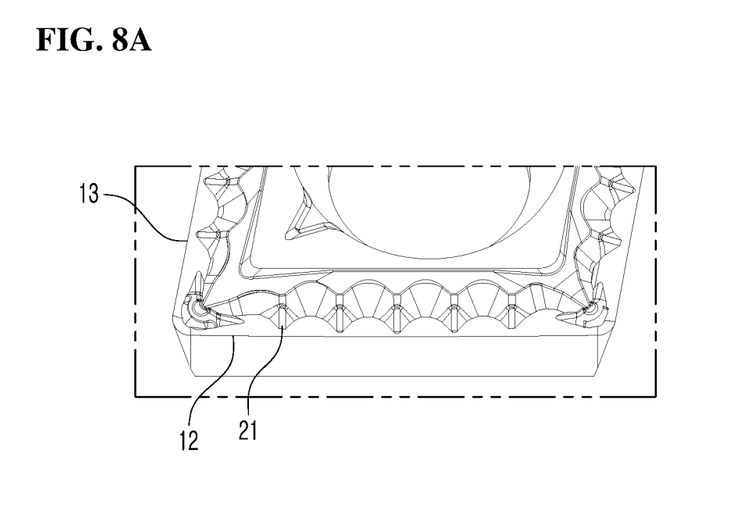
FIGS. 8A and 8B are views illustrating an auxiliary protrusion in the cutting insert of FIGS. 1A and 1B.
Figure 8B:
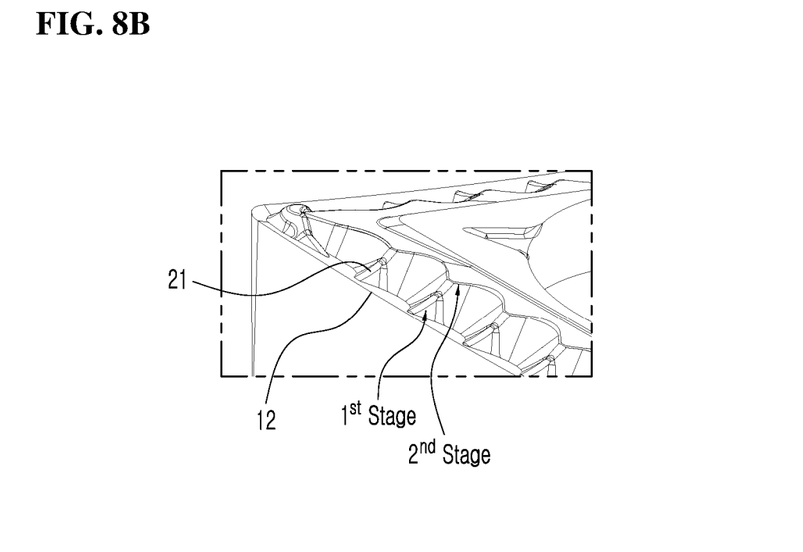

In addition, as illustrated in FIGS. 8A and 8B, a plurality of two-stage auxiliary protrusions 21 may be formed along the first edge portion 12 and the second edge portion 13. The two-stage auxiliary protrusion 21 may have a substantially triangular shape when viewed toward the top surface. These two-stage auxiliary protrusion may be connected to the first raised portion 14.

Accordingly, the direction of long chips that may occur during the cutting process can be changed, or generation of long chips can be reduced by the breaking at the corner portion. In addition, since it is possible to use the corner portion of the cutting insert during chamfering, the chip breaking can also be performed for the corner portion. For reference, when long chips stay within the inner diameter of the workpiece, they may cause scratches on the workpiece after machining, and since it takes time for the operator to remove it, it negatively affects the cutting automation process.

The cutting insert according to the embodiment of the present disclosure having the configuration described above may be mounted to a pocket part of the cutting tool (a tool holder) by using a fastening bolt.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The cutting insert according to the present disclosure can be used in the field of cutting tools.

What is claimed is:

1. A polygonal cutting insert comprising a top surface, a bottom surface, and a lateral surface connecting the top surface and the bottom surface, wherein:
   the top surface includes a corner portion, and a first edge portion and a second edge portion respectively extending from the corner portion;
   the corner portion includes a corner cutting edge, the first edge portion includes a first cutting edge, and the second edge portion includes a second cutting edge, respectively;
   a first raised portion and a second raised portion stepped from the first raised portion are formed on the top surface and along a center line connecting a center of the corner portion and a center of the top surface;

the first raised portion is located closer to the corner portion than the second raised portion is, and the first raised portion is inclined downwardly from the second raised portion toward the corner portion;

the second raised portion is formed at a higher position from the bottom surface than the first raised portion; and a side portion connected to the first raised portion is inclined downwardly from the second raised portion toward the first and second cutting edges;

wherein a main breaker is provided in front of the first raised portion; and the main breaker protrudes from a corner cutting edge cutting surface of the corner cutting edge, a first cutting edge cutting surface of the first cutting edge, and a second cutting edge cutting surface of the second cutting edge, and includes a lower inclined surface connected to the corner cutting edge cutting surface, the first cutting edge cutting surface, the second cutting edge cutting surface, and an upper inclined surface connected to the lower inclined surface; and wherein a boundary line between the upper inclined surface and the lower inclined surface is formed at a position higher than the corner cutting edge, the first cutting edge, and the second cutting edge.

2. The cutting insert according to claim 1, wherein the lower inclined surface is formed in a concave shape.

3. The cutting insert according to claim 2, wherein a radius of curvature of the lower inclined surface increases as it approaches a center of the corner portion.

4. The cutting insert according to claim 3, further comprising auxiliary blade protrusions extending to two sides of the main breaker, wherein the auxiliary blade protrusions are distanced away from the first cutting edge and the second cutting edge with heights of the auxiliary blade protrusions also decreasing, as the auxiliary blade protrusions are farther away from a center of the corner portion, and when viewed toward the lateral surface, have a lower height than the first cutting edge, the second cutting edge, and the corner cutting edge.

5. The cutting insert according to claim 4, wherein widths of the auxiliary blade protrusions decrease as the auxiliary blade protrusions are farther away from the center of the corner portion.

6. A cutting tool equipped with the cutting insert according to claim 4.

7. The cutting insert according to claim 1, wherein the corner cutting edge is located at a higher position than the first cutting edge and the second cutting edge.

8. A cutting tool equipped with the cutting insert according to claim 7.

9. The cutting insert according to claim 1, comprising a plurality of two-stage auxiliary protrusions formed along the first edge portion and the second edge portion.

10. The cutting insert according to claim 9, wherein the two-stage auxiliary protrusions have a triangular shape when viewed toward the top surface.

11. A cutting tool equipped with the cutting insert according to claim 9.

12. A cutting tool equipped with the cutting insert according to claim 1.

* * * * *